United States Patent
Morford

(10) Patent No.: US 6,275,410 B1
(45) Date of Patent: Aug. 14, 2001

(54) DATA RECORDING SYSTEMS AND METHODS FOR FACILITATING DATA RECOVERY WITH EMITTER FAILURE

(75) Inventor: Chris L. Morford, Eagle, ID (US)

(73) Assignee: Hewlett-Packard Co., Palo Alto, CA (US)

(*) Notice: Subject to any disclaimer, the term of this patent is extended or adjusted under 35 U.S.C. 154(b) by 0 days.

(21) Appl. No.: 09/710,356

(22) Filed: Nov. 9, 2000

(51) Int. Cl.[7] .................................... G11C 11/00
(52) U.S. Cl. ................... 365/151; 365/118; 365/128; 369/101
(58) Field of Search ................... 365/151, 118, 365/128, 217, 237; 369/101, 100

(56) References Cited

U.S. PATENT DOCUMENTS

| | | |
|---|---|---|
| 5,557,596 | 9/1996 | Gibson et al. ........... 369/101 |
| 5,675,531 * | 10/1997 | McClelland ........... 365/151 |

FOREIGN PATENT DOCUMENTS

401116941A * 5/1989 (JP).

* cited by examiner

*Primary Examiner*—David Nelms
*Assistant Examiner*—David Lam

(57) ABSTRACT

A preferred data storage system includes a memory storage device that incorporates a storage medium and electron beam emitters which are configured to electrically communicate with the storage medium. The storage medium and the emitters are configured to move relative to each other so that each emitter may provide a beam of electrons within a respective coverage area of the storage medium. Each coverage area includes at least one storage area which is configurable in at least two structural states, which represent information stored in the storage areas. A data recovery system also is provided which is communicatively coupled with the memory storage device. The data recovery system is configured to determine whether a first emitter of the memory storage device has failed and to recover information stored in at least one of the storage areas of the first emitter with a second emitter of the memory storage device. Computer readable media and methods also are provided.

22 Claims, 6 Drawing Sheets

DATA RECORDING SYSTEMS AND METHODS FOR FACILITATING DATA RECOVERY WITH EMITTER FAILURE

BACKGROUND OF THE INVENTION

1. Field of the Invention

The present invention generally relates to data storage and, more specifically, to systems and methods employing atomic resolution storage (ARS) techniques that facilitate data recovery during failure of one or more data storage system emitters.

2. Background of the Invention

The apparent insatiability of consumers for higher capacity, higher speed memory storage devices has led to the development of memory storage techniques such as atomic resolution storage (ARS). As is known, a storage device employing ARS technology includes a number of electron field emitters that are adapted to write data to and read data from various storage areas of a storage medium. The field emitters, commonly are referred to as "point-emitters", are configured with sharp tips, e.g., each tip including a radius of curvature of approximately one nanometer to hundreds of nanometers.

During operation, a predetermined potential difference is applied between a field emitter and a corresponding gate. Due to the sharp tip of the emitter, an electron beam current is extracted from the emitter towards the storage area. Writing of data from an emitter to a storage area is accomplished by temporarily increasing the power density of the electron beam current to modify the structural state of the surface of the storage area. In contrast, reading data from the storage area is accomplished by observing the effect of the storage area on the electron beam of the emitter, or the effect of the electron beam on the storage area. More specifically, reading typically is accomplished by collecting secondary and/or backscattered electrons when an electron beam, i.e., an electron beam with a lower power density than that of the electron beam utilized for writing data to the storage area, is applied to the storage medium.

An ARS storage medium is formed of material characterized by a structural state that can be changed from crystalline to amorphous by a beam of electrons. Since the amorphous state has a different secondary electron emission coefficient (SEEC) and backscattered electron coefficient (BEC) than the crystalline state, a different number of secondary and backscattered electrons are emitted from each storage area, in response to an electron beam, depending upon the current structural state of that storage area. Thus, by measuring the number of secondary and backscattered electrons, the structural state of the storage area and, therefore, the data stored by the storage area, may be determined.

Heretofore, however, failure of a field emitter may adversely affect the ability of an ARS storage device to retrieve and/or reconstruct data stored in the storage area(s) associated with the failed emitter. Accordingly, there is a need for improved devices, systems and methods that address these and other shortcomings of the prior art.

SUMMARY OF THE INVENTION

Briefly described, the present invention relates to data storage implementations employing atomic resolution storage (ARS) techniques that facilitate data recovery during failure of one or more data storage system emitters. In this regard, embodiments of the present invention may be construed as providing methods for recovering data from a memory storage device. Typically, the memory storage device utilizes a storage medium and electron beam emitters configured to electrically communicate with the storage medium. The storage medium and the emitters are configured to move relative to each other so that each emitter may provide a beam of electrons within a respective coverage area of the storage medium. Each coverage area includes one or more storage areas that are configurable in one of at least two structural states, which represent information stored in the storage areas. In a preferred embodiment, the method includes determining whether a first emitter of the memory storage device has failed, and initiating recovery of information stored in at least one of the storage areas of the first emitter with a second emitter.

Some embodiments of the present invention may be construed as providing data storage systems. In a preferred embodiment, the data storage system includes a memory storage device that incorporates a storage medium and electron beam emitters which are configured to electrically communicate with the storage medium. The storage medium and the emitters are configured to move relative to each other so that each emitter may provide a beam of electrons within a respective coverage area of the storage medium. Each coverage area includes at least one storage area which is configurable in at least two structural states, which represent information stored in the storage areas. A data recovery system also is provided which is communicatively coupled with the memory storage device. The data recovery system is configured to determine whether a first emitter of the memory storage device has failed and to recover information stored in at least one of the storage areas of the first emitter with a second emitter of the memory storage device.

An alternative embodiment of the data storage system includes a memory storage device and means for determining whether a first emitter of the memory storage device has failed.

Other embodiments of the present invention may be construed as providing computer readable media incorporating instructions for recovering data from a memory storage device. In a preferred embodiment, the computer readable medium includes logic configured to determine whether a first emitter of the memory storage device has failed, and logic configured to initiate recovery of information stored in at least one storage area of the first emitter with a second emitter of the memory storage device.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention.

DETAILED DESCRIPTION OF A PREFERRED EMBODIMENT

Figure 1:
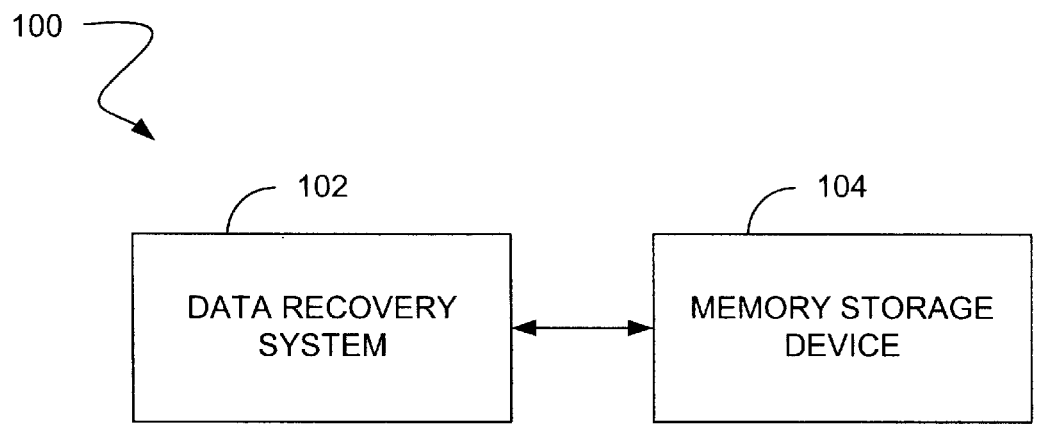
FIG. 1 is a block diagram of a preferred embodiment of the present invention.

Reference will now be made to the drawings wherein like numerals indicate corresponding parts throughout the several views. As shown in FIG. 1, a preferred embodiment of the data storage system 100 of the present invention includes a data recovery system 102 that is communicatively coupled with a memory storage device 104. Memory storage device utilizes ARS technology, an example of which is described in greater detail hereinafter, for the storage and retrieval of data.

Figure 2:
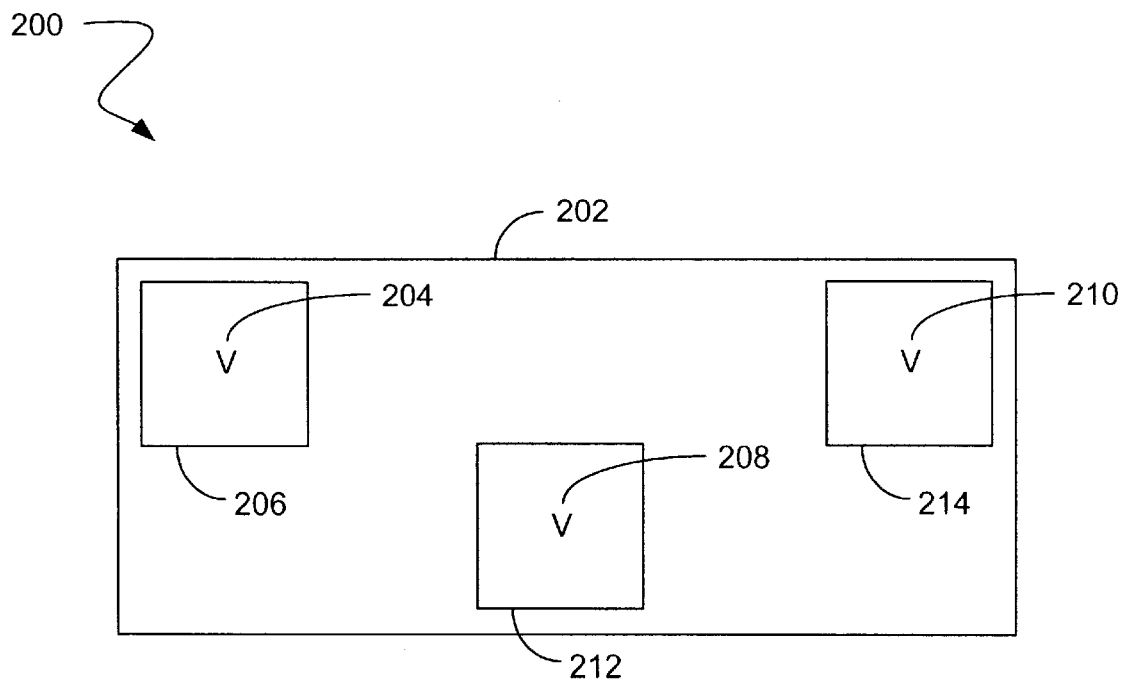
FIG. 2 is a schematic diagram depicting a representative memory storage device utilized by the present invention.

Memory storage device 104 incorporates one or more memory modules, such as module 200 depicted in FIG. 2, for example. Module 200 includes a storage medium 202 that cooperates with at least one field emitter, e.g., emitter 204, so that the emitter is able to encode (write) data to and decode (read) data from the storage medium. More specifically, each emitter is configured to write and read data within an emitter coverage area 206 that includes one or more storage areas (not shown). Since a coverage area may be smaller than the area of the storage medium adapted for data storage, a typical storage medium may include numerous emitters and associated coverage areas, e.g., emitters 208 and 210, and coverage areas 212 and 214, among others.

Figure 3:
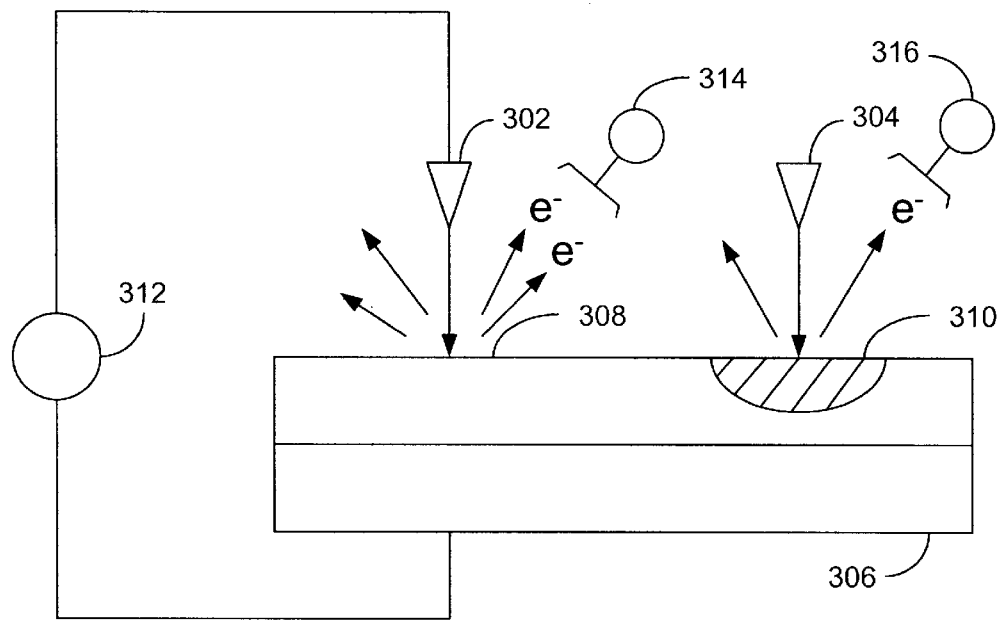
FIG. 3 is a schematic diagram illustrating field emitters reading from storage areas of a representative storage medium.
Figure 4:
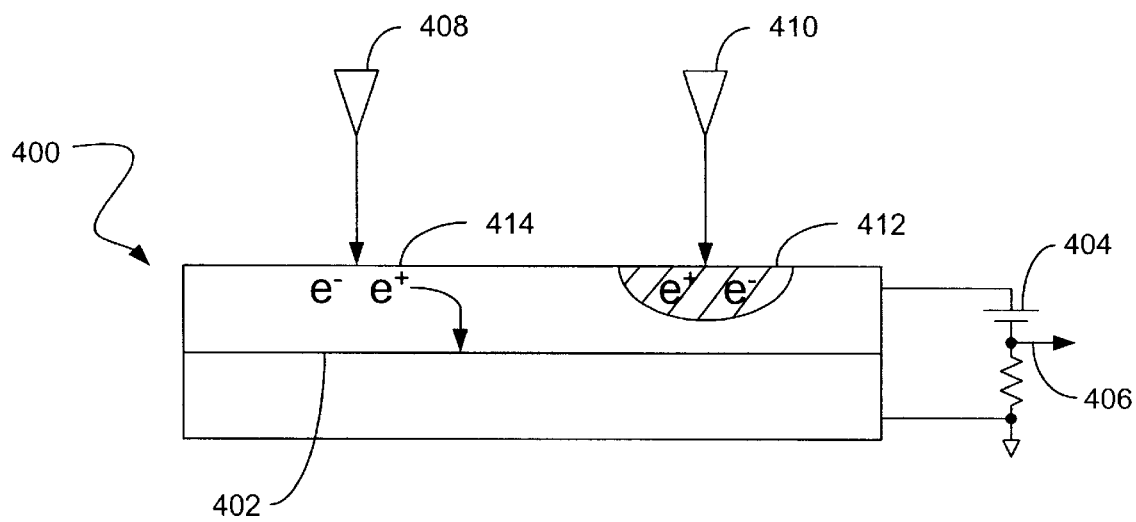
FIG. 4 is a schematic diagram illustrating the storage medium shown in FIG. 3.
Figure 5A:
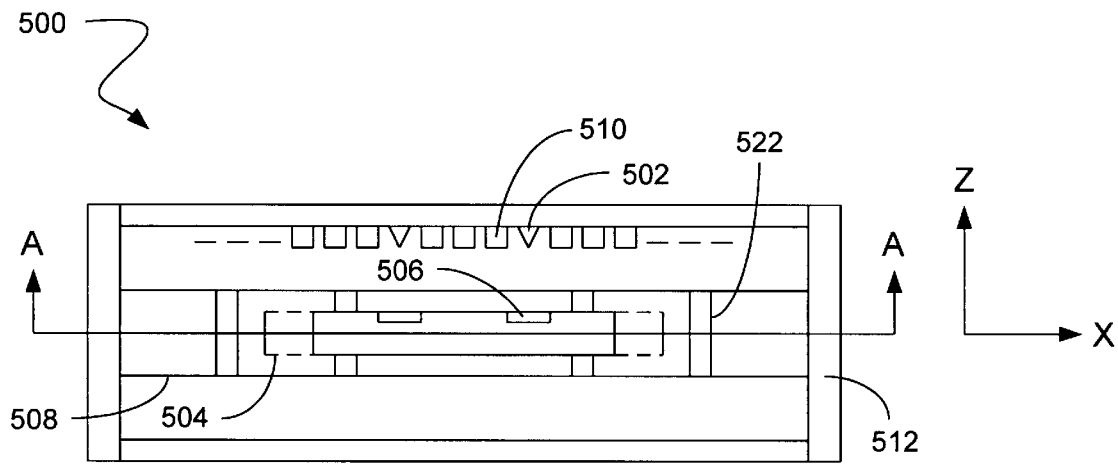
FIGS. 5A and 5B are various views of a representative memory storage device which may be utilized with the present invention.
Figure 5B:
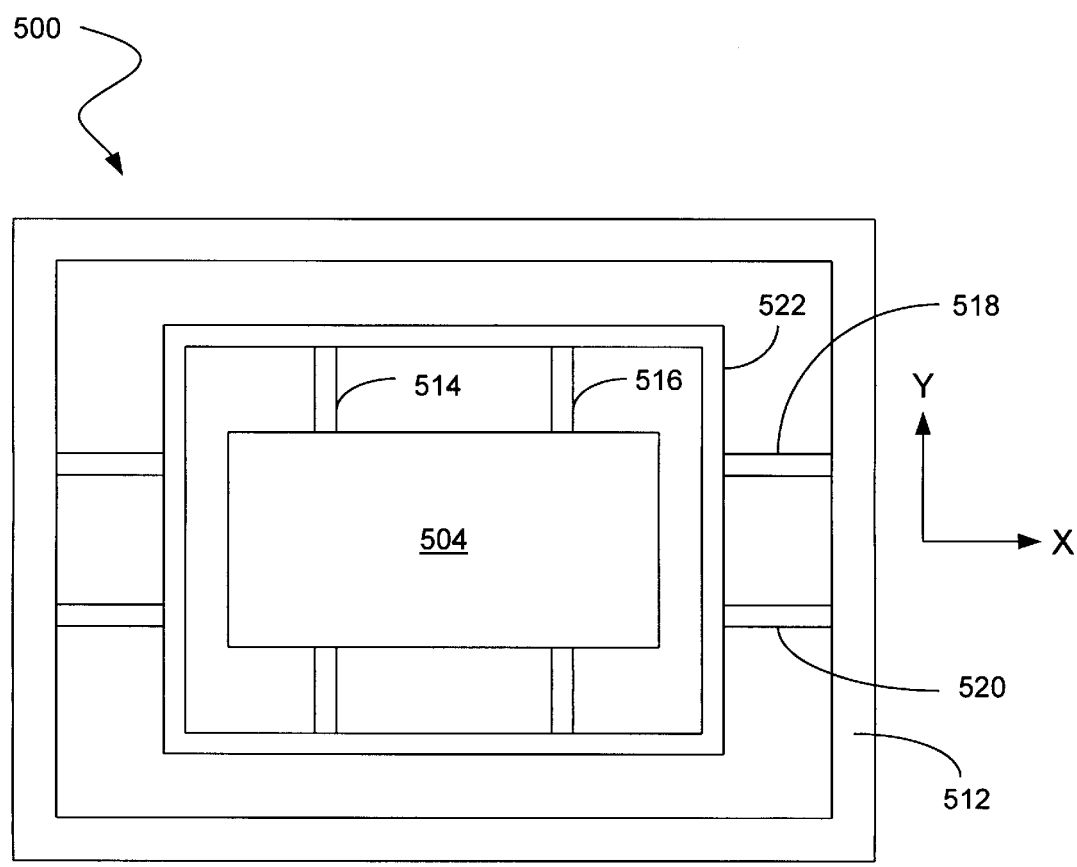

Referring now to FIGS. 3 and 4, representative ARS systems will be described in greater detail. These figures, as well as FIGS. 5A and 5B, are disclosed and described in U.S. Pat. No. 5,557,596, which is hereby incorporated by reference in its entirety. It should be noted, however, that the ARS systems shown and described herein are not the only ARS systems to be utilized with the present invention, to the contrary, the present invention may be utilized with various types and configurations of ARS systems provided that such a system be capable of writing data to and reading data from a storage medium.

The schematic diagram of FIG. 3 depicts representative field emitters 302 and 304 reading from a storage medium 306. In particular, emitter 302 is reading from storage area 308 and emitter 304 is reading from storage area 310. Storage area 308 and storage area 310 are provided with different structural states, as described hereinbefore. So provided, when electrons, such as those provided by source 312, are extracted from the emitters and into the respective storage areas, a different number of secondary electrons and backscattered electrons may be detected relative to each storage area. Detection of the secondary and backscattered electrons may be accomplished by electron collectors, e.g., collectors 314 and 316 (as utilized herein, the term "emitter" may be used to refer to both an emitter and/or an emitter and its associated collector). Thus, by monitoring the magnitude of a signal current collected by the electron collectors, the structural state of and, therefore, the data, i.e., bit, stored in the storage area may be identified. It should be noted that the difference in the number of secondary electrons and backscattered electrons collected from one storage area, as compared to a storage area having a different structural state, may be greater or lesser depending upon the type of material and the type of modification made to the material.

FIG. 4 schematically depicts an alternative technique for reading data from an ARS storage area. As shown in FIG. 4, storage medium 400 is based on a diode structure, which may be a PN junction, a schottky, barrier or any other type of electronic valve. Data is stored by locally altering the surface of the diode in such a way that collection efficiency for minority carriers generated by the altered region is different from that of an unaltered region. The collection efficiency for minority carriers is defined as the fraction of minority carriers generated by the instant electrons which are swept across the diode junction 402 when it is biased by an external circuit 404 to cause a signal current 406 to flow in the external circuit. Although FIG. 4 illustrates a preferred external circuit 404, it will be appreciated that this circuit is provided for purposes of example only.

In operation, the field emitters 408 and 410 emit narrow beams of electrons onto the surface of the diode 400. The incident electrons excite electron-hole pairs near the surface of the diode. Because the diode is reverse-biased by the external circuit 404, minority carriers that are generated by the incident electrons are swept toward the diode junction 402. Electrons that reach the junction 402 are then swept across the junction. Accordingly, minority carriers that do not recombine with majority carriers before reaching the junction are swept across the junction, causing a current flow in the external circuit 404.

Writing to the diode 400 is accomplished by increasing the power density of the electron beam enough to locally alter the physical properties of the diode. This alteration affects the number of minority carriers swept across the junction 402 when the same area is radiated with a lower power density (read) electron beam. For instance, the recombination rate in a written area 412 could be increased relative to an unwritten area 414 so that the minority carriers generated in the written area 412 have an increased probability of recombining with minority carriers before they have a chance to reach and cross the junction 402. Hence, a smaller current flows in the external circuit 404 when the read electron beam is incident upon a written area 412 than when it is incident upon an unwritten area 414. Conversely, it is also possible to start with a diode structure having a high recombination rate and to write bits by locally reducing the recombination rate. In such an embodiment, the magnitude of the current resulting from the minority carriers depends upon the state of the storage area and the current continues the output signal to indicate the bit stored.

FIGS. 5A and 5B illustrate a preferred embodiment of a memory storage device 500 suitable for implementation with the data storage system of the present invention. In this regard, FIG. 5A shows a side cross-sectional view of memory storage device 500 which includes a number of field emitters 502, a storage medium 504 that incorporates a number of storage areas 506, and a micromover 508 that scans the storage medium with respect to the field emitters or vice versa. In a preferred embodiment, each storage area 506 is responsible for storing one bit of information. As mentioned hereinbefore, the field emitters are responsible for reading and writing information on the storage areas by utilizing electron beams. Thus, field emitters suitable for the present invention preferably are of the type that produce electron beams which are narrow enough to achieve the desired bit density of the storage medium, and which provide the power density of the beam current needed for reading from and writing to the storage medium.

During operation, a predetermined potential difference is applied between a field emitter 502 and a corresponding gate, such as a circular gate 510, which surrounds the emitter. So provided, an electron beam current is extracted from the emitter 502 towards the storage area 506. Depending upon the distance between the emitters 502 and the storage medium 504, the type of emitters, and the spot size (e.g., bit size) required, electron optics may be useful in focusing the electron beams. Voltage also may be applied to the storage medium 504 to either accelerate or decelerate the emitted electrons or to aid in focusing the emitted electrons. A casing 512 also may be provided which maintains the storage medium 504 in a partial vacuum.

FIG. 5B shows a top view of the cross-section B—B of FIG. 5A and illustrates the storage medium 504 being held by two sets of thin-walled microfabricated beams 514 and 516, and 518 and 520 (although a beam-type micromover is shown and described herein, various other types and configurations of micromovers may be utilized by the present invention). Faces of the first set of thin-walled beams, i.e., 514 and 516, are in the X-Z plane. This set of beams may be flexed in the X direction allowing the storage medium 504 to move in the X direction with respect to the casing 512. Faces of the second set of thin-walled beams, i.e., 518 and 520, are in the X-Z plane. This set of beams allows the storage medium 504 to move in the Y direction with respect to the casing 512. The storage medium is held by the first set of beams to a frame 522. The frame is held by the second set of beams to the casing 512. Thus, the field emitters may scan over the storage medium 504, or the storage medium may scan over the field emitters, in the X-Y directions by electrostatic, electromagnetic, piezoelectric or other suitable methods and/or mechanisms.

Figure 6:
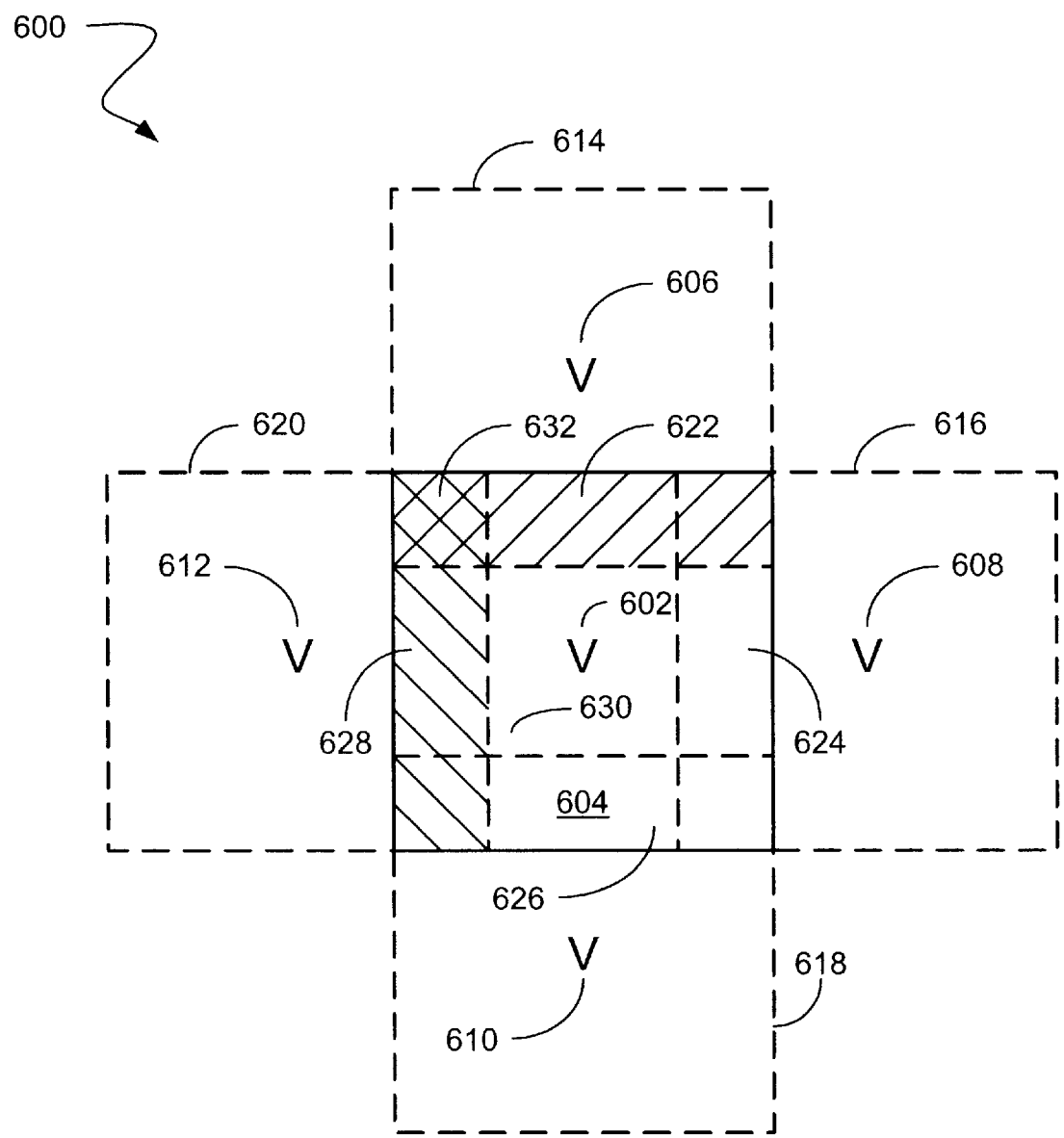
FIG. 6 is a schematic diagram showing detail of representative emitter coverage areas.

Referring now to FIGS. 6 through 9, architecture and functionality of a preferred embodiment of the present invention will be described in greater detail. A representative portion 600 of a memory storage device is depicted in FIG. 6 that includes a field emitter 602 and a corresponding emitter coverage area 604. As described hereinbefore, coverage area 604 may include one or more storage areas (not shown) that are adapted to be electrically engaged by emitter 602 and any associated electron collector (not shown). Arranged about emitter 602 are various other emitters, e.g., emitters 606, 608, 610 and 612, and their respective coverage areas 614, 616, 618 and 620. The coverage areas of the emitters arranged adjacent to emitter 602 at least partially overlap coverage area 604 of emitter 602. For example, coverage area 614 of emitter 606 overlaps coverage area 604 in an overlap region 622. Thus, in the configuration depicted in FIG. 6, data may be saved across five regions of coverage area 604, e.g., regions 622, 624, 626 and 628, which are overlap regions of adjacent emitters, and region 630, which is unique to emitter 602. So configured, parity information may be saved in the overlap regions whereby, if emitter 602 fails, data stored in the regions 622, 624, 626 and 628 may be rebuilt utilizing the parity information. Preferably, memory module firmware, for example, enables the emitters corresponding to the regions 622, 624, 626 and 628 immediately to begin processing requests for data when the primary emitter, e.g., emitter 602, fails.

Additionally, at least a portion of the coverage area 604 may be overlapped by more than one emitter coverage area. For example, coverage area 604 is overlapped by coverage area 614 to yield overlap region 622 with an additional overlap region 628 being provided by coverage area 620. So configured, when an emitter, such as emitter 602 fails, data stored by that emitter within region 632 may be recovered by one or more adjacent emitters, e.g., emitters 606 and 612. Depending upon the particular application, field emitters, and their corresponding coverage areas, which may be configured in various shapes and sizes, may be arranged to provide for a variety of overlap regions, e.g., varying by size, shape, etc., with all such arrangements being considered well within the scope of the present invention.

A preferred embodiment of the memory storage system of the present invention may be construed as providing a data recovery system which may be implemented in hardware, software, firmware, or a combination thereof. In a preferred embodiment, however, the data recovery system is implemented as firmware, which can be adaptable to run on different platforms and operating systems as shall be described further herein. In particular, a preferred embodiment of the data recovery system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer readable medium can be, for example, but is not limited to, an electronic, magnetic, optical, electromagnetic, infrared, or semi-conductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 7:
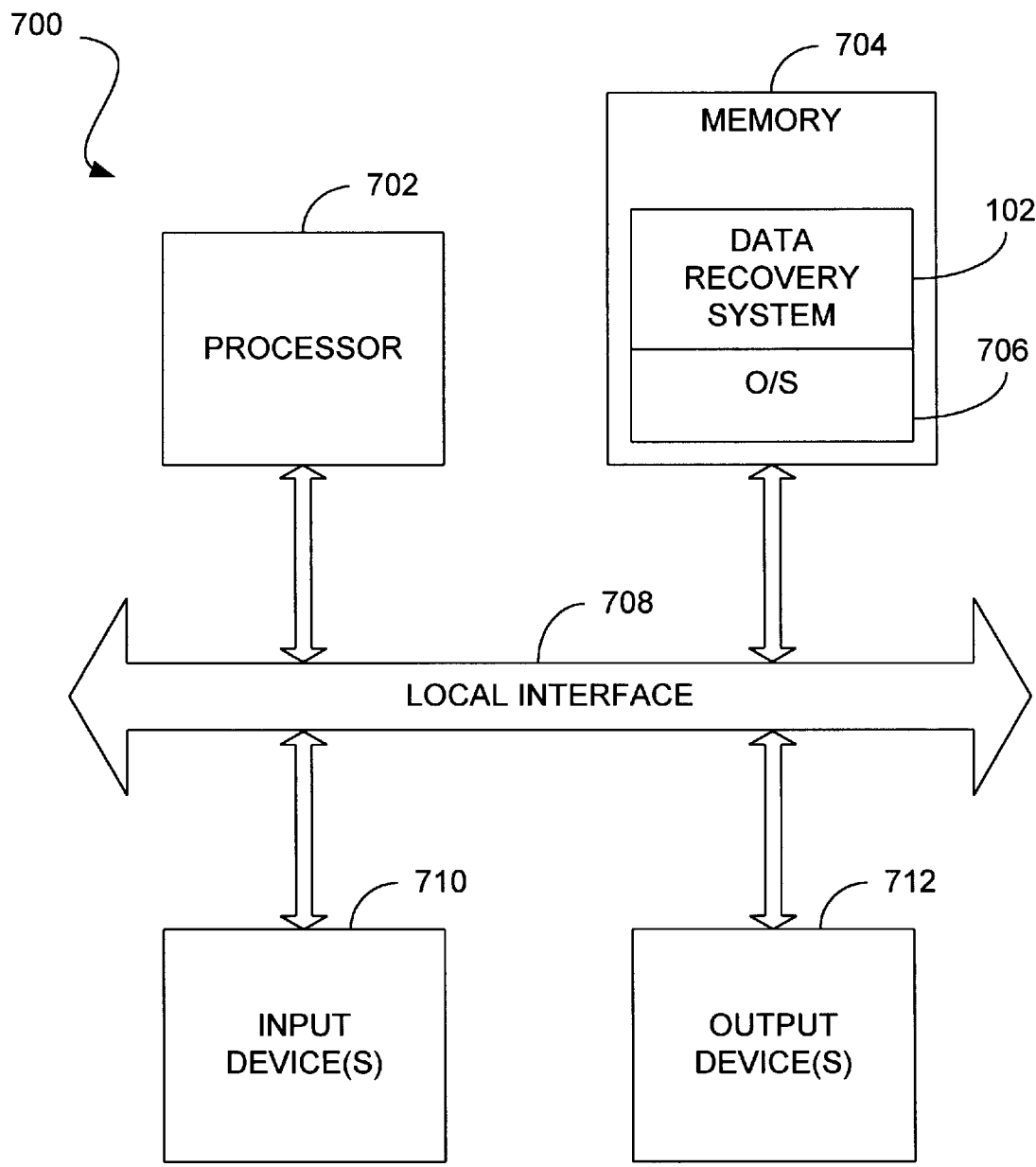
FIG. 7 is a schematic diagram of a computer or processor-based system which may be utilized by the present invention.

FIG. 7 illustrates a typical computer or processor-based system 700 which may utilize the data recovery system 102 of the present invention. As shown in FIG. 7, a computer system 700 generally comprises a processor 702 and a memory 704 with an operating system 706. Herein, the memory 704 may be any combination of volatile and nonvolatile memory elements, such as random access memory or read only memory. The processor 702 accepts instructions and data from memory 704 over a local interface 708, such as a bus(es). Preferably, the system also includes an input device(s) 710 and an output device(s) 712. Examples of input devices may include, but are not limited to, a serial port, a scanner, or a local access network connection. Examples of output devices may include, but are not limited to, a video display, a Universal Serial Bus, or a printer port. Generally, this system may run any of a number of different platforms and operating systems, including, but not limited to, HP-ux™, Linux™, Unix™, Sun Solaris™ or Windows NT™ operating systems. The data recovery system of the present invention, the functions of which shall be described hereinafter, preferably resides in memory 204 and is executed by the processor 202.

Figure 8:
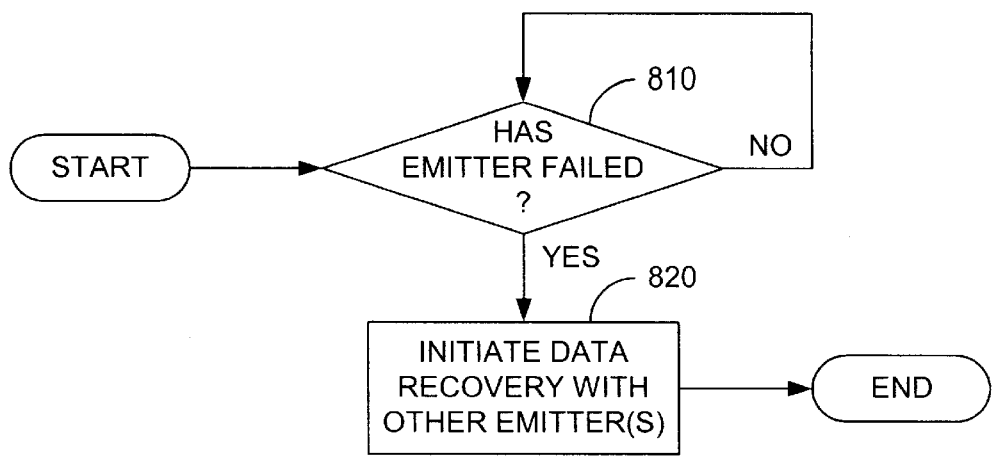
FIG. 8 is a flow chart depicting functionality of a preferred embodiment of the present invention.
Figure 9:
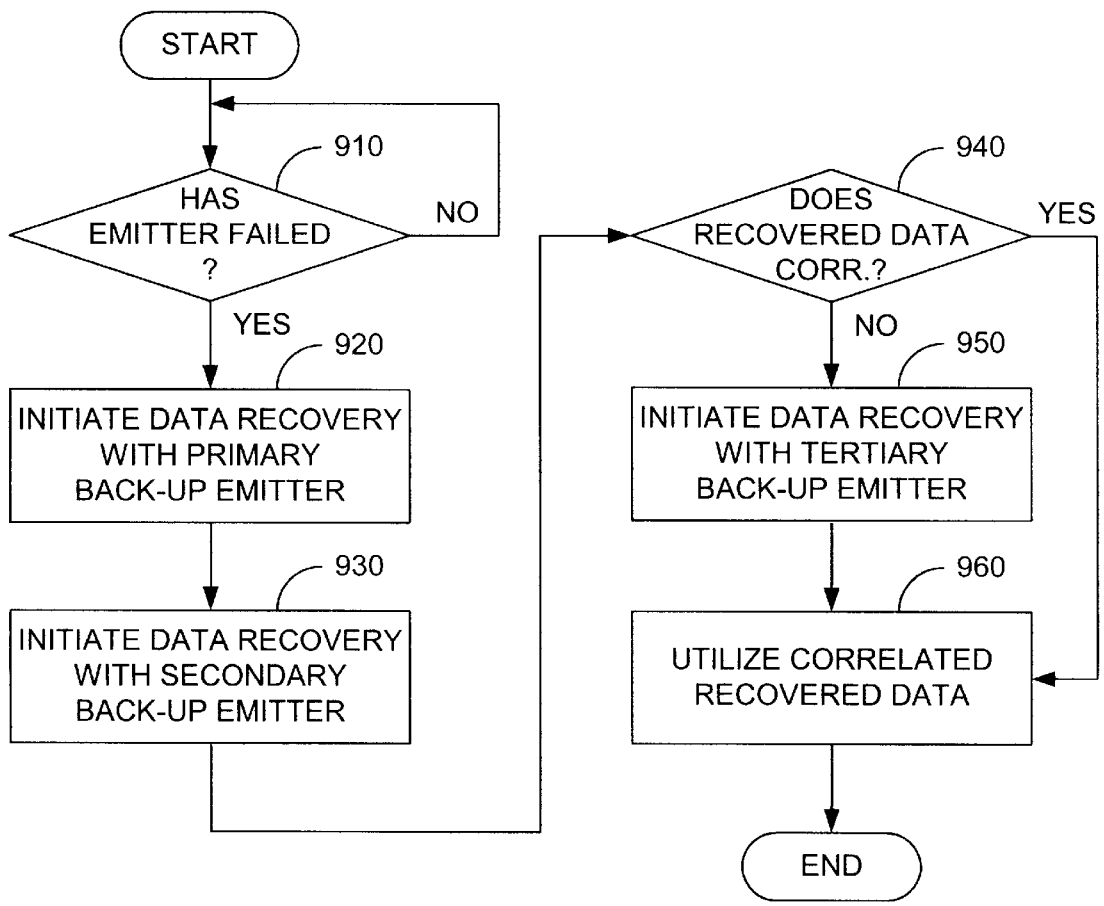
FIG. 9 is a flow chart depicting functionality of a preferred embodiment of the present invention.

The flowcharts of FIGS. 8 and 9 show the functionality of implementations of the data recovery system 102 depicted in FIG. 7. In this regard, each block of the flowcharts may represent a module segment or portion of code which comprises one or more executable instructions for implementing the specified logical function or functions. It should also be noted that, in some alternative implementations, the functions noted in the various blocks may occur out of the order depicted in the respective figures. For example, two blocks shown in succession may, in fact, be executed substantially concurrently where the blocks may sometimes be executed in the reverse order depending upon the functionality involved.

In regard to the embodiment of the data recovery system depicted in FIG. 8, the functionality of that embodiment may be construed as beginning at block 810 where a determination may be made as to whether an emitter of a memory storage device has failed, i.e., whether an emitter of the memory storage device is no longer able to read data from and/or write data to one or more of its storage areas. If it is determined, such as in block 820, that an emitter has failed, data recovery of data associated with the failed emitter may be initiated with one or more other emitters. As described briefly hereinbefore, the one or more emitters may be arranged adjacent to the failed emitter and may provide coverage areas that overlap with at least a portion of the coverage area of the failed emitter. Thus, one or more emitters that have coverage areas overlapping with the coverage area of the failed emitter may be utilized to read data from storage areas associated with the failed emitter. So provided, at least some of the data stored in storage areas of the failed emitter may be recovered.

In regard to the embodiment of the data recovery system depicted in FIG. 9, the functionality of that embodiment may be construed as beginning at block 910 where a determination may be made as to whether an emitter has failed. If it is determined that an emitter has failed, the process may proceed to block 920, where recovery of data associated with the failed emitter may be initiated with a primary backup emitter. Such a primary backup emitter may be a emitter arranged adjacent to the failed emitter that is selected based on various criteria including, the emitter providing the largest overlap region relative to the coverage area of the failed emitter, the emitter incorporating an overlap region corresponding with the data to be recovered, etc. Proceeding to block 930, data recovery also may be initiated by a secondary backup emitter. Thereafter, such as depicted in block 940, a determination may be made as to whether the data recovered by the primary backup emitter corresponds to data recovered by the secondary backup emitter. If it is determined that the data do not correspond, data recovery may be initiated with a tertiary backup emitter, such as depicted in block 950. If, however, the data do correspond, the process may proceed to block 960 where the correlated recovered data may be utilized. The process also may proceed to block 960 after data recovery has been attempted with the tertiary backup emitter.

In embodiments configured with a tertiary backup emitter, the tertiary backup emitter may be utilized as an added check of the recovered data. For instance, if the data recovered by the primary and secondary backup emitters do not correspond, the tertiary backup emitter may serve as a "tie breaker", i.e., the data is assigned a value corresponding to the value recovered by the tertiary emitter.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A method for recovering data from a memory storage device, the memory storage device utilizing a storage medium and a plurality of electron beam emitters configured to electrically communicate with the storage medium, the storage medium and the plurality of emitters being configured to move relative to each other such that each emitter may provide a beam of electrons within a respective coverage area of the storage medium, each coverage area having a storage area formed therein being configurable in one of a plurality of structural states to represent information stored in the storage area, said method comprising:

determining whether a first emitter of the plurality of emitters has failed; and initiating recovery of information stored in at least one of the storage areas of the first emitter with a second emitter of the plurality of emitters.

2. The method of claim 1, further comprising:

initiating recovery of information from at least one of the storage areas of the first emitter with a third emitter; and comparing the information recovered with the second emitter with the information recovered with the third emitter.

3. The method of claim 2, wherein, if the information recovered with the second emitter and the information recovered with the third emitter correspond, utilizing the corresponding information.

4. The method of claim 2, wherein, if the information recovered with the second emitter and the information recovered with the third emitter do not correspond, initiating recovery of information from the storage area of the first emitter with a fourth emitter; and utilizing the information recovered by the fourth emitter.

5. Computer readable medium having instructions for recovering data from a memory storage device, the memory storage device utilizing a storage medium and a plurality of electron beam emitters configured to electrically communicate with the storage medium, the storage medium and the plurality of emitters being configured to move relative to each other such that each emitter may provide a beam of electrons within a respective coverage area of the storage medium, each coverage area having a storage area formed therein being configurable in one of a plurality of structural states to represent information stored in the storage area, said computer readable medium comprising:

logic configured to determine whether a first emitter of the plurality of emitters has failed; and logic configured to initiate recovery of information stored in at least one storage area of the first emitter with a second emitter of the plurality of emitters.

6. The computer readable medium of claim 5, wherein the logic configured to initiate recovery of information comprises:

logic configured to initiate recovery of information from at least one of the storage areas of the first emitter with a third emitter; and logic configured to compare the information recovered with the second emitter with the information recovered with the third emitter.

7. The computer readable medium of claim 6, wherein the logic configured to compare the information comprises logic configured to utilize the information recovered if the information recovered with the second emitter and the information recovered with the third emitter correspond.

8. The computer readable medium of claim 6, wherein the logic configured to compare the information comprises:

logic configured to initiate recovery of information from at least one of the storage areas of the first emitter with a fourth emitter if the information recovered with the second emitter and the information recovered with the third emitter do not correspond; and logic configured to utilize the information recovered by the fourth emitter.

9. A data storage system comprising:

a memory storage device having a storage medium and a plurality of electron beam emitters configured to electrically communicate with the storage medium, the storage medium and the plurality of emitters being configured to move relative to each other such that each emitter may provide a beam of electrons within a respective coverage area of the storage medium, each coverage area having a storage area formed therein being configurable in one of a plurality of structural states to represent information stored in the storage area; and a data recovery system communicatively coupled with the memory storage device, the data recovery system being configured to determine whether a first emitter of the plurality of emitters has failed and to recover information stored in at least one of the storage areas of the first emitter with a second emitter of the plurality of emitters.

10. The data storage system of claim 9, wherein said memory storage device has a micromover, said micromover having a first frame, a second frame disposed at least partially within said first frame, a first set of beams engaged between said first frame and said second frame, and a second set of beams engaged between said second frame and said storage medium, said first set of beams being configured to facilitate movement of said storage medium along a first axis relative to said emitters, said second set of beams being configured to facilitate movement of said storage medium along a second axis relative to said emitters, said first axis being substantially perpendicular to said second axis.

11. The data storage system of claim 9, wherein said first emitter is configured to write information to and read information from a first coverage area of said storage medium, and said second emitter is configured to write information to and read information from a second coverage area of said storage medium, said second coverage area being coextensive with at least a portion of said first coverage area.

12. The data storage system of claim 9, wherein the memory storage device has a third emitter, and wherein the data recovery system is configured to recover information stored in the at least one of the storage areas of the first emitter with the third emitter and compare the information recovered by the second emitter with the information recovered by the third emitter.

13. The data storage system of claim 12, wherein said first emitter is configured to write information to and read information from a first coverage area of said storage medium, said second emitter is configured to write information to and read information from a second coverage area of said storage medium, and said third emitter is configured to write information to and read information from a third coverage area of said storage medium, said second coverage area and said third coverage area each being coextensive with at least a portion of said first coverage area.

14. The data storage system of claim 12, wherein the memory storage device has a fourth emitter, and wherein the data recovery system is configured to recover information stored in the at least one of the storage areas of the first emitter with the fourth emitter if the information recovered with the second emitter and the information recovered with the third emitter do not correspond.

15. A data storage system comprising:

a memory storage device having a storage medium and a plurality of electron beam emitters configured to electrically communicate with the storage medium, the storage medium and the plurality of emitters being configured to move relative to each other such that each emitter may provide a beam of electrons within a respective coverage area of the storage medium, each coverage area having a storage area formed therein being configurable in one of a plurality of structural states to represent information stored in the storage area; and means for determining whether a first emitter of the plurality of emitters has failed.

16. The data storage system of claim 15, further comprising means for initiating recovery of information stored in at least one of the storage areas of the first emitter such that, if a determination is made that the first emitter of the plurality of emitters has failed, the means for initiating recovery of information attempts to recover information stored in at least one of the storage areas of the first emitter.

17. The data storage system of claim 15, wherein the means for initiating recovery of information comprises a second emitter of the plurality of emitters, said first emitter is configured to write information to and read information from a first coverage area of said storage medium, and said second emitter is configured to write information to and read information from a second coverage area of said storage medium, said second coverage area being coextensive with at least a portion of said first coverage area.

18. The data storage system of claim 15, wherein said memory storage device has a micromover, said micromover having a first frame, a second frame disposed at least partially within said first frame, a first set of beams engaged between said first frame and said second frame, and a second set of beams engaged between said second frame and said storage medium, said first set of beams being configured to facilitate movement of said storage medium along a first axis relative to said emitters, said second set of beams being configured to facilitate movement of said storage medium along a second axis relative to said emitters, said first axis being substantially perpendicular to said second axis.

19. The data storage system of claim 17, wherein the means for initiating recovery of information comprises a third emitter of the plurality of emitters, the data storage system having means for comparing the information recovered with the second emitter with the information recovered with the third emitter.

20. The data storage system of claim 19, wherein said first emitter is configured to write information to and read information from a first coverage area of said storage medium, said second emitter is configured to write information to and read information from a second coverage area of said storage medium, and said third emitter is configured to write information to and read information from a third coverage area of said storage medium, said second coverage area and said third coverage area each being coextensive with at least a portion of said first coverage area.

21. The data storage system of claim 19, further comprising means for utilizing the corresponding information such that, if the information recovered with the second emitter and the information recovered with the third emitter correspond, the means for utilizing the corresponding information utilizes the corresponding information.

22. The data storage system of claim 21, wherein the means for initiating recovery of information comprises a fourth emitter such that, if the information recovered with the second emitter and the information recovered with the third emitter do not correspond, the means for utilizing the corresponding information utilizes the information recovered by the fourth emitter.

* * * * *